UNITED STATES PATENT OFFICE.

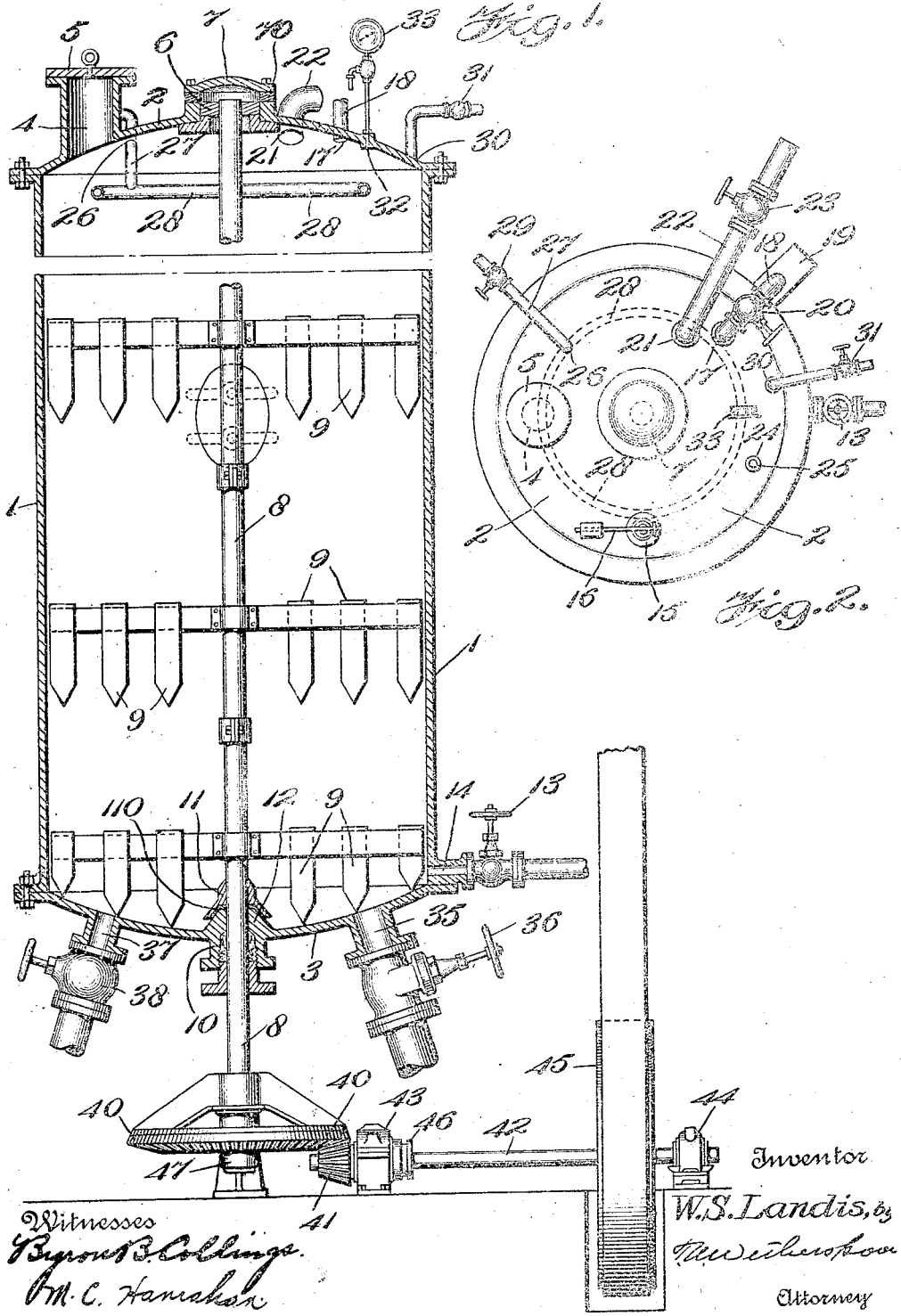
W. S. LANDIS.
APPARATUS FOR PRODUCING AMMONIA.
APPLICATION FILED FEB. 10, 1915.
1,183,885. Patented May 23, 1916.

WALTER S. LANDIS, OF NIAGARA FALLS, NEW YORK, ASSIGNOR, BY MESNE ASSIGNMENTS, TO AMMO-PHOS CORPORATION, A CORPORATION OF NEW YORK.

APPARATUS FOR PRODUCING AMMONIA.

1,183,885.  Specification of Letters Patent.  Patented May 23, 1916.

Application filed February 10, 1915. Serial No. 7,413.

*To all whom it may concern:*

Be it known that I, WALTER S. LANDIS, a citizen of the United States, residing at Niagara Falls, in the county of Niagara and State of New York, have invented certain new and useful Improvements in Apparatus for Producing Ammonia; and I do hereby declare the following to be a full, clear, and exact description of the invention, such as will enable others skilled in the art to which it appertains to make and use the same.

This invention relates to an apparatus for producing ammonia from crude or commercial calcium cyanamid through a reaction upon the latter with water forming essentially ammonia gas and a residue consisting largely of calcium carbonate.

Numerous attempts have been made to carry out this conversion of crude cyanamid into ammonia by crude forms of towers or boilers, but in each of these older forms of apparatus there was required a large amount of preliminary treatment of the crude calcium cyanamid, or lime nitrogen; and there were also entailed complications in the filling and discharging of the apparatus itself, as well as low chemical efficiencies in the transformation of said cyanamid into ammonia.

The apparatus here to be described eliminates the above faults in the older apparatus, in that it does away with all preliminary treatment of the crude calcium cyanamid other than the grinding, which it undergoes in preparation for its direct use as a fertilizer; it avoids all the troubles heretofore experienced incident to filling and discharging the apparatus, as this is done largely by manipulation of gates and valves; and it insures a decomposition of the calcium cyanamid to almost 100 per cent. efficiency on a large commercial scale, which has not been heretofore attained on such a scale.

The essential features of the apparatus are clearly shown in the accompanying drawing, forming a part of this specification, in which—

Figure 1 is a diagrammatic longitudinal sectional view partly broken away of an apparatus made in accordance with my invention; and Fig. 2 is a plan view of the parts shown in Fig. 1.

The relative sizes of the various parts are dependent of course upon the quantity of material to be treated at one time; but the equipment itself it will be understood is capable of being built in almost any size one could find useful in commercial work.

In the drawings 1 represents a shell of metal capable of withstanding pressures of 25 atmospheres and higher, and preferably made cylindrical for the sake of economy. Said vessel is provided with a cover 2 and a bottom 3, also capable of withstanding said high pressures; and said cover is conveniently provided with an opening 4, for the introduction of the charge, and said opening or inlet 4, is conveniently provided with a closure 5, as shown. In addition to said inlet 4, the cover 2, may be provided with a bearing block 6, forming a top bearing for the shaft 8, and if desired a cap such as 7, and packing ring such as 70 of lead or other suitable material may also be provided. Mounted on said shaft 8 are the paddles or stirrers 9, and on the bottom 3, a stuffing box such as 10, is also provided to form a lower bearing for said shaft 8. In order to protect said stuffing box and bearing 10, as well as to further support and steady the shaft, the latter is provided with the concave cap 11 and the lead or other packing 110 fitting the cone-shaped projection 12 of the bottom 3. 14 represents a steam inlet provided with a valve 13, and 15 represents a safety outlet closed by the weighted valve 16.

17 represents an exit preferably in the cover 2, to which may be attached the pipe 18, leading to the suction apparatus 19, and provided with the valve 20.

21 represents an opening to which is attached the pipe 22, having the valve 23 for drawing off the evolved ammonia, while 24 is an opening for containing a thermometer 25.

26 indicates an opening to accommodate a pipe 27 having a valve 29 and having a foraminous member 28 for spraying water into the tank or autoclave 1.

30 represents a blow off having a valve 31 for relieving all pressure in the autoclave 1, whenever it is desired to do so, while 32 represents an opening for receiving a manometer 33 for at all times indicating the pressure in the tank 1.

The bottom 3 is also preferably provided with an exit 35, controlled by a valve 36, and with a compressed air inlet 37 controlled by the valve 38.

On the lower end of the shaft 8 is the bevel gear 40 meshing with the pinion 41, carried by the shaft 42, mounted on the bearings 43 and 44 and provided with the power pulley 45. Said shaft 42 is also provided with a controlling clutch indicated at 46, and 47 is a step bearing for said vertical stirring shaft 8.

The operation of the autoclave is as follows:—Water or liquor from a previous operation, may be introduced into the tank 1, to any suitable height, whereupon crude calcium cyanamid, or lime nitrogen is fed in through the opening or inlet 4, and thus subjected to the spray from the perforated pipe 28. Any calcium carbid that may be present in the cyanamid will be immediately decomposed and the evolved acetylene is then sucked out of the apparatus by means of the fan 19 or other suction device, which may draw air or other gases in through the inlet 4. This insures the removal of the acetylene gas in a greatly diluted form and thereby avoids all danger of explosions. The incoming crude cyanamid is also immediately slaked, and a slurry is formed by reason of the fact that the stirrers 9 are kept in continual rotation, so that a thorough mixture is obtained. The steam is let in through the inlet 14 until the manometer 33 indicates a pressure corresponding to say from 2 to 4 atmospheres, and which also corresponds to a temperature sufficiently high to start the reaction. The reaction being an exothermic one, the valve 13 may now be closed or nearly closed and ammonia will be evolved exothermically. The evolved ammonia may be drawn off by opening the valve 23 in a pipe 22, whereupon additional steam may be admitted for say about 15 minutes and a further decomposition of the crude cyanamid may be had. The ammonia thus evolved from the second reaction is likewise drawn off through the pipe 22, and the process may be repeated a third time if desired. When all of the fixed nitrogen has been thus disengaged from the cyanamid, that portion of the ammonia which is dissolved in the liquid may be conveniently dislodged, either by admitting compressed air through the inlet 14, or through the inlet 37 as may be desired. This compressed air will at once drive out the dissolved ammonia, leaving only the liquid and its suspended solids in the autoclave.

It is important in carrying out this process that the agitation by the stirrers 9 be had continuously both during the charging of the apparatus and during the evolution of the ammonia. Otherwise the cyanamid material is liable to cake into hard masses on the interior of the apparatus and to be very difficult to remove later. In fact this has been one of the chief faults in the older apparatus working upon the principle of an ordinary boiler without a stirring device.

I have also found that the crude cyanamid when dropped into water tends to form small hard lumps with a dry unaltered interior. By stirring vigorously during the charging operation I avoid the formation of these lumps, and therefore obtain a very much higher yield of ammonia from the cyanamid than would be otherwise the case.

The evolved ammonia gas may be removed either as a mixture of steam and ammonia as it comes from this apparatus, or it can be dehydrated and purified by passing through suitable columns, dephlegmators, drying, and purifying apparatus, depending upon the use to which it will be subsequently put.

In operating this apparatus, in order to complete the transformation of the calcium cyanamid into ammonia, I find it desirable to add to the slurry small quantities of an alkali salt, such as sodium carbonate, sodium hydrate, for purposes known to those skilled in the art.

Whenever the pressure as shown by the manometer gets too high, it can be relieved by opening the discharge valve 31, and thus the temperature also in the apparatus may be readily controlled. Further when the ammonia has all been discharged from the apparatus, the said valve 31 may be likewise opened to relieve the autoclave 1 of all pressure, whereupon the valve 36 may be opened, and the liquid and solids may be discharged into any suitable filter whereupon the solids and liquids are separated and the filter cakes thus obtained may be suitably washed. The hot liquid from the filters may be conveniently returned to the apparatus ready for receiving new charges.

It will thus be seen that by the use of an apparatus such as disclosed, and especially by employing the stirrers such as 9 in an apparatus of this nature, I am enabled to avoid the serious objections due to the caking of the crude cyanamid that have been heretofore encountered, while at the same time I carry out a much more rapid operation and also attain a higher efficiency in the evolution of ammonia than has been heretofore possible on large commercial scales. In addition to the above by closing the valve 13 after the steam has raised the slurry to the reacting temperature, and permitting the reaction to proceed exothermically I am enabled to use about one fourth the quantity of steam that has been heretofore thought possible, and further by not using the steam continuously, I am enabled to relieve the apparatus of excessive high pressures throughout the operation to which the old devices were subjected. The lessening of the periods during which these high pressures have been heretofore maintained greatly lessens the upkeep of the apparatus, in that it saves repairs to packings, joints, etc., and is found to greatly simplify the operation.

It is obvious that those skilled in the art may vary the details of construction as well as the arrangement of parts without departing from the spirit of my invention and, therefore, I do not wish to be limited to the above disclosure except as may be required by the claims.

What I claim is:—

1. In an apparatus for decomposing crude calcium cyanamid, the combination of a containing vessel; suitable inlets and outlets for said vessel; a disk like bearing located at one end of said vessel; a packing means located at the other end of said vessel; and a stirrer having a shaft one end of which is connected to said disk like bearing, and the other end portion of which passes through said packing means, substantially as described.

2. In an apparatus for decomposing crude calcium cyanamid, the combination of a containing vessel; suitable inlets and outlets for said vessel; a disk like bearing located at one end of said vessel; a cover for said bearing; a packing means located at the other end of said vessel; a hollow cone like bearing located at said packing means; and a stirrer having a shaft one end of which is connected to said disk like bearing and the other end portion of which is connected to said hollow cone like bearing and passes through said packing means, substantially as described.

In testimony whereof I affix my signature, in presence of two witnesses.

WALTER S. LANDIS.

Witnesses:
S. WARREN MAYO,
J. L. DOTAN.